2,957,857

PROCESS FOR THE SUSPENSION POLYMERIZATION OF VINYL HALIDES

Richard H. Martin, Jr., Springfield, Mass., assignor to Monsanto Chemical Company, St. Louis, Mo., a corporation of Delaware No Drawing. Filed June 25, 1956, Ser. No. 593,318

10 Claims. (Cl. 260—92.8)

This invention relates to a suspension polymerization process for the production of vinyl halide-containing polymers. More particularly, this invention relates to a suspension polymerization process in which certain novel suspending agents are employed.

In one of the customary preparations of vinyl halide-containing polymers, the monomers are polymerized in an aqueous medium containing a suspending agent to obtain the polymer in the form of small granules which are easily separated from the polymerization medium by filtration. Ideally, the granular polymers so obtained should be of a uniform small size and highly porous in nature so as to readily absorb plasticizers. The presence of large, non-porous glassy granules is undesirable, since such granules do not absorb plasticizer readily and this frequently leads to heterogeneity in the final product. Such heterogeneity is particularly noticeable when the vinyl halide-containing polymer is calendered into thin films.

Among the better suspending agents that have been proposed for the suspension polymerization of vinyl halide-containing polymers are the water-soluble interpolymers of maleic compounds such as the water-soluble interpolymers of maleic anhydride with vinyl acetate, vinyl methyl ether, ethylene, etc. While polymerization systems containing such suspending agents give high quality vinyl halide-containing polymers, it would be desirable to have improved polymerization systems which would give still smaller polymer particles and polymer particles of a more porous nature.

It is an object of this invention to provide an improved suspension polymerization process for the preparation of vinyl halide-containing polymers.

Another object of this invention is to provide an improved suspension polymerization process for the preparation of vinyl halide-containing polymers in which novel suspending agents are employed.

Other objects and advantages of this invention will become apparent from the following detailed description thereof.

It has been discovered that vinyl halide-containing polymers of fine particle size and good porosity can be prepared by polymerizing a vinyl halide monomer in an aqueous medium in the presence of a water-soluble interpolymer of a maleic compound as the primary suspending agent and a hydroxyl group-containing polymer as an auxiliary or secondary suspending agent. The hydroxyl group-containing polymers that are employed as auxiliary or secondary suspending agents contain 1.5–12.0 weight percent hydroxyl groups and are (1) interpolymers of an acrylate or methacrylate ester of a 1–10 carbon atom monohydric alkanol and allyl alcohol or methallyl alcohol or (2) the analogous polymers obtained by reducing an interpolymer of an acrylate or methacrylate ester of a 1–10 carbon atom monohydric alkanol and acrolein or methacrolein.

The following examples are set forth to illustrate more clearly the principle and practice of this invention to those skilled in the art. All parts are by weight.

EXAMPLE I

Part A

A polyvinyl chloride polymer is prepared employing the polymerization system set forth below:

| Component: | Parts by weight |
|---|---|
| Water | 150 |
| Vinyl chloride | 100 |
| Maleic suspending agent | 0.3 |
| Auxiliary suspending agent | 0.15 |
| Lauroyl peroxide | 0.2 |

The above noted components are charged to a glass-lined reaction vessel that is swept free of oxygen and then sealed. The sealed reaction vessel is rotated end over end at 50° C. for 20 hours, at the end of which time the polymerization is complete. This reaction vessel and polymerization technique are employed in all of the subsequent examples.

The product has a desirable small particle size with approximately 90% of the polymer passing through a 100 mesh screen. The polymer is highly porous and readily absorbs plasticizer.

The maleic suspending agent employed in this example is an interpolymer of 50 mol percent vinyl acetate and 50 mol percent maleic anhydride. Approximately 4 mol percent of the maleic anhydride groups are esterified with 2-ethylhexanol. The auxiliary suspending agent employed is an interpolymer of ethyl acrylate and allyl alcohol containing approximately 3.3 weight percent hydroxyl groups.

Part B

Part A above is repeated except that the auxiliary suspending agent is not included in the polymerization system. The polymer product that is obtained is less porous than the product of Part A and only about 70% of the polymer will pass through a 100 mesh screen.

Part C

Part A above is repeated except that the monomer mixture employed consists of 90 parts vinyl chloride and 10 parts vinyl acetate. Essentially comparable results are obtained.

EXAMPLE II

Part A

Example I, Part A, is repeated except that the auxiliary suspending agent employed is an interpolymer of ethyl acrylate and allyl alcohol containing about 7.3 weight percent hydroxyl groups. The polymer obtained is highly porous in nature and 86% of the polymer will pass through a 100 mesh screen.

Part B

Part A above is repeated except that the monomer charge consists of 95 parts vinyl chloride and 5 parts diethyl maleate. Comparable results are obtained.

EXAMPLE III

Example I, Part A, is repeated except for two changes. First, the auxiliary suspending agent employed is an interpolymer of 2-ethylhexyl acrylate and allyl alcohol containing about 3.3 weight percent hydroxyl groups. Secondly, the concentration of the auxiliary suspending agent is increased to 0.6 part. The polymer that is obtained is highly porous in nature and 81% of the polymer will pass through a 100 mesh screen.

EXAMPLE IV

To illustrate the wide latitude that may be employed in setting the ratio of the maleic suspending agent to the auxiliary suspending agent several polymerizations are run employing the basic polymerization recipe and suspending agents set forth in Example I, Part A. The concentration of the maleic suspending agent is set at two different levels and the quantity of auxiliary suspending agent employed is varied to give ratios of primary maleic suspending agent to the auxiliary suspending agent varying from 2/1 to 0.5/1. The concentrations and ratios of suspending agents employed are shown in Table I together with the weight percent of the polymer passing through a 100 mesh screen.

TABLE I

| Run # | Wt. Percent Maleic Suspending Agent | Wt. Percent Auxiliary Suspending Agent | Ratio, MSA/ASA [1] | Percent Polymer Through 100 Mesh Screen |
|---|---|---|---|---|
| 1a | 0.3 | 0 | | 72 |
| 1b | 0.3 | 0.15 | 2/1 | 90 |
| 1c | 0.3 | 0.3 | 1/1 | 91 |
| 1d | 0.3 | 0.6 | 0.5/1 | 94 |
| 2a | 0.15 | 0 | | 66 |
| 2b | 0.15 | 0.30 | 0.5/1 | 72 |
| 2c | 0.15 | 0.15 | 1/1 | 76 |
| 2d | 0.15 | 0.075 | 2/1 | 81 |
| 3a | 0.2 | 0 | | 72 |

[1] MSA/ASA = Maleic suspending agent auxiliary suspending agent.

It will be observed in the above table that in each polymerization the addition of the auxiliary suspending agent to the system containing the primary maleic suspending agent gives a product in which a larger percentage of the polymer particles will pass through a 100 mesh screen. In addition to the smaller particle size, each of the polymers prepared in the presence of the auxiliary suspending agents is more porous and more readily absorbs plasticizer than the corresponding product prepared at the same concentration of primary maleic suspending agent, but in the absence of the auxiliary suspending agent. A comparison of runs 1a and 3a demonstrates the polymer particle size cannot be decreased materially by increasing the concentration of the primary maleic suspending agent above 0.2%.

The primary suspending agents employed in the process of the present invention are water-soluble interpolymers of maleic compounds such as maleic acid, maleic anhydride and maleinimide. Typical examples of such water-soluble interpolymers include the interpolymers of maleic acid or maleic anhydride with interpolymerizable vinylidene monomers such as vinyl methyl ether, vinyl acetate, ethylene, isobutylene, and such interpolymers that are partially esterified with 1–10 weight percent of saturated aliphatic alcohols such as butanol, hexanol, 2-ethylhexanol, tetrahydrofurfuryl alcohol, etc. Water-soluble maleic interpolymers of this type are known and their use in the suspension polymerization of vinyl halide-containing polymers is described in U.S. Patents 2,470,911 and 2,476,474 issued to Massimo Baer and in the copending applications of R. I. Longley and R. H. Martin, Jr., Serial No. 530,612, filed August 25, 1955, now U.S. 2,823,200 and Serial No. 530,881, filed August 26, 1955, now U.S. 2,824,862. Perhaps the most efficient of the maleic suspending agents in the practice of this invention are the interpolymers of vinyl acetate and maleic anhydride and particularly the partial esters of such interpolymers. Such water-soluble maleic interpolymers may be prepared by numerous well-known polymerization techniques.

The auxiliary or secondary suspending agents employed in the process of the present invention are interpolymers of (1) an acrylate or methacrylate ester of a 1–10 carbon atom monohydric alkanol and (2) an unsaturated alcohol of the group consisting of allyl alcohol, methallyl alcohol and mixtures thereof. The proportion of the unsaturated alcohol contained in the interpolymer is such that the interpolymer contains 1.5–12.0 weight percent hydroxyl groups and more preferably 3.0–10.0 weight percent hydroxyl groups. The acrylate or methacrylate ester included in the auxiliary suspending agent may be the ester of virtually any 1–10 carbon atom monohydric alkanol, but preferably is the acrylate or methacrylate ester of a monohydric alkanol containing from 1 to 8 carbon atoms, e.g., methyl acrylate, ethyl acrylate, butyl acrylate, 2-ethylhexyl acrylate, methyl methacrylate, isopropyl methacrylate, amyl methacrylate, etc. If desired, mixtures of two or more such acrylate or methacrylate esters may be included in the auxiliary suspending agents. Such interpolymers may be prepared by admixing the acrylate ester and the unsaturated alcohol, either with or without a suitable solvent, and heating the mixture to 150–200° C. under autogenous pressure.

Fully equivalent auxiliary suspending agents can be prepared by an alternate procedure in which the acrylate or methacrylate ester of the 1–10 carbon atom monohydric alkanol is interpolymerized with acrolein, methacrolein or mixtures thereof to prepare polymers containing carbonyl groups and subsequently reducing the carbonyl groups to hydroxyl groups, e.g., by hydrogenating the carbonyl group containing interpolymers. Such carbonyl group containing interpolymers can be catalytically reduced over nickel catalysts at 150–200° C. under 2,000–5,000 pounds hydrogen pressure when the interpolymers are dissolved in suitable solvents, e.g., tetrahydrofurane.

Both the primary suspending agent and the auxiliary suspending agent are employed in small amounts. The primary water-soluble maleic interpolymer suspending agent is employed in the amount of 0.005–2.0 weight percent and more particularly 0.05–0.5 weight percent, such percentages being based upon the monomers. The hydroxyl group-containing auxiliary suspending agent is ordinarily employed within these same concentration limits. As illustrated in Example IV, the ratio of the primary water-soluble maleic interpolymer suspending agent to the hydroxyl group-containing auxiliary suspending agent may be varied widely, but is usually adjusted so that the ratio of the maleic suspending agent to the auxiliary suspending agent falls within the limits of 10/1 to 0.2/1 and preferably 2/1 to 0.5/1.

Except for the suspending agents employed, the polymerizations of the present invention are carried out in the conventional manner. The ratio of water to monomers may vary from about 1:1 to about 9:1, but is ordinarily set in the range of about 1.5:1 to 2:1. The polymerization initiators employed are normally free radical generating initiators such as benzoyl peroxide, lauroyl peroxide, ditertiary butyl peroxide, toluyl peroxide and the like.

The process of the present invention is useful in the homopolymerization of vinyl fluoride, vinyl chloride, vinyl bromide and mixtures thereof and the interpolymerization of such vinyl halides with interpolymerizable essentially water-insoluble unsaturated compounds such as vinyl esters of carboxylic acids, e.g., vinyl acetate, vinyl propionate, vinyl butyrate, vinyl stearate, vinyl benzoate; esters of alpha,beta unsaturated monocarboxylic acids, e.g., methyl acrylate, ethyl acrylate, butyl acrylate, allyl acrylate, and the corresponding esters of methacrylic acid; amides such as acrylamide, acrylanilide, methacrylamide, etc.; nitriles, e.g., acrylonitrile, methacrylonitrile; vinylidene chloride; trichloroethylene; esters of alpha,beta unsaturated polycarboxylic acids, e.g., the methyl, ethyl, propyl, butyl, amyl, hexyl, heptyl, octyl, allyl and methallyl esters of maleic, itaconic, and fumaric acids and the like. Preferably, in the case of interpolymerizations, more than 50% by weight of the mixture of monomers is a vinyl halide, and especially vinyl chloride.

The above descriptions and particularly the examples are set forth by way of illustration only. Many other modifications and variations thereof will be obvious to

What is claimed is:

1. In a process for the suspension polymerization of a vinyl halide of the group consisting of vinyl fluoride, vinyl chloride and vinyl bromide in which the vinyl halide is suspended and polymerized in water containing a water-soluble interpolymer of maleic compound of the group consisting of maleic anhydride, maleic acid and maleinimide and an interpolymerizable vinylidene monomer as a suspending agent for the vinyl halide polymer; the improvement which comprises incorporating in the polymerization system a minor amount of a hydroxyl group-containing interpolymer containing from 1.5 to 12.0 weight percent hydroxyl groups as an auxiliary suspending agent; said hydroxyl group-containing interpolymer being an interpolymer of (1) an unsaturated alcohol of the group consisting of allyl alcohol, methallyl alcohol and mixtures thereof and (2) an acrylate ester of the group consisting of acrylate and methacrylate esters of 1–10 carbon atom monohydric alkanols prepared by admixing said unsaturated alcohol and said acrylate ester in a homogeneous system and heating at 150–200° C. under autogenous pressure.

2. The process of claim 1 in which the vinyl halide polymerized in vinyl chloride.

3. The process of claim 2 in which the hydroxyl group-containing interpolymer employed as the auxiliary suspending agent is an interpolymer of ethyl acrylate and allyl alcohol.

4. The process of claim 2 in which the hydroxyl group-containing interpolymer employed as the auxiliary suspending agent is an interpolymer of 2-ethylhexyl acrylate and allyl alcohol.

5. The process of claim 3 in which the water-soluble interpolymer of the maleic compound employed as the suspending agent is a vinyl acetate-maleic anhydride interpolymer.

6. The process of claim 5 in which both the water-soluble interpolymer of the maleic compound and the hydroxyl group-containing interpolymer are present in the amount of from 0.005 to 2.0 weight percent of the monomers.

7. The process of claim 6 wherein at least 50 weight percent of vinyl chloride is interpolymerized with less than 50 weight percent of a vinyl ester of a monocarboxylic acid.

8. The process of claim 7 in which the vinyl ester of a monocarboxylic acid employed is vinyl acetate.

9. The process of claim 6 wherein at least 50 weight percent of vinyl chloride is interpolymerized with less than 50 weight percent of an alkyl ester of a 4 to 5 carbon atom alpha,beta unsaturated dicarboxylic acid; the alkyl group of said alkyl ester of an alpha,beta unsaturated dicarboxylic acid containing from 1 to 8 carbon atoms.

10. The process of claim 9 in which the alkyl ester of the alpha,beta unsaturated dicarboxylic acid employed in diethyl maleate.

References Cited in the file of this patent

UNITED STATES PATENTS

| | | |
|---|---|---|
| 2,227,163 | Starck et al. | Dec. 31, 1940 |
| 2,300,566 | Hahn et al. | Nov. 3, 1942 |
| 2,470,911 | Baer | May 24, 1949 |
| 2,483,960 | Baer | Oct. 4, 1949 |
| 2,824,862 | Longley | Feb. 25, 1958 |

UNITED STATES PATENT OFFICE

CERTIFICATION OF CORRECTION

Patent No. 2,957,857                      October 25, 1960

Richard H. Martin, Jr.

It is hereby certified that error appears in the above numbered patent requiring correction and that the said Letters Patent should read as corrected below.

Column 3, line 27, Table I, in the footnote thereto, for "agent auxiliary" read -- agent/auxiliary --; column 5, line 9, for "of maleic" read -- of a maleic --; same column 5, line 27, and column 6, line 24, for "in", each occurrence, read -- is --.

Signed and sealed this 2nd day of May 1961.

(SEAL)
Attest:

ERNEST W. SWIDER                                    DAVID L. LADD
Attesting Officer                                         Commissioner of Patents